Patented Dec. 12, 1950

2,533,276

UNITED STATES PATENT OFFICE 2,533,276

PREPARATION OF ESTER-ACETALS

Charles H. McKeever, Glenside, and George H. Agnew, Philadelphia, Pa., assignors to Rohm & Haas Company, Philadelphia, Pa., a corporation of Delaware No Drawing. Application July 26, 1949, Serial No. 106,984

4 Claims. (Cl. 260—410.9)

This invention relates to a new process whereby acetals of esters are prepared economically and efficiently.

This process comprises reacting, at a pressure of 1000 to 4000 lbs. per square inch and at a temperature of 80° C. to 200° C., carbon monoxide, hydrogen, an ester of a mono-unsaturated aliphatic acid, and either methanol or ethanol in the presence of a cobalt catalyst, such as cobalt carbonyl or a cobalt salt of an organic carboxylic acid, which salt is soluble in the reaction mixture.

The reaction which is involved is clearly illustrated by the following reaction of ethyl acrylate with methanol, carbon monoxide and hydrogen to form ethyl gamma,gamma-dimethoxybutyrate:

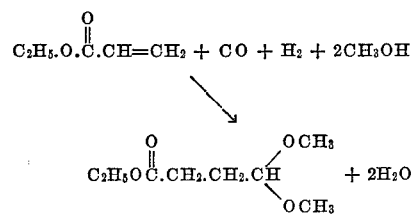

The double bond in the acid portion of the ester is the point at which reaction occurs, and in effect a hydrogen atom adds to one carbon atom joined by the double bond and a group —CH(OCH₃)₂ or CH(OC₂H₅)₂ adds to the other carbon atom so joined. When the double bond in the ester is connected to a terminal carbon atom, the acetal group adds to this carbon atom and a hydrogen to the adjacent carbon atom. When, however, the double bond is attached to other than a terminal carbon atom, an acetal group or a hydrogen atom can ordinarily add to either carbon atom joined by the double bond and thus give rise to a mixture of isomers. The general reaction is illustrated by the following equation:

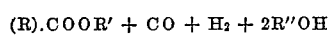

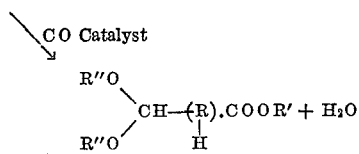

in which (R) represents a monovalent, aliphatic, hydrocarbon radical containing a single double bond, R' is a monovalent, hydrocarbon radical which is free of non-benzenoid unsaturation, R'' is either a methyl or an ethyl group, and in which (R).COOR' taken together represents a methyl or ethyl ester of an aliphatic acid containing one double bond in the acid portion thereof.

Although the reactants combine in the ratios shown in the above equations, it is permissible, and usually desirable, to employ an excess of one or more. Thus, for example, although the carbon monoxide and hydrogen combine in equimolar amounts, an excess of either can be used; and a carbon monoxide-to-hydrogen ratio of 2/1 to 1/2 is operable. An excess of either the olefinic ester or alcohol can also be present in the reaction mixture and can be subsequently separated, for example by distillation, from the acetal.

While methanol and ethanol take part in this reaction readily, the higher alcohols are very much more sluggish.

The esters which react with carbon monoxide, hydrogen and methanol or ethanol can best be described as those of the aliphatic carboxylic acids containing 3 to 22 carbon atoms and a single double bond, and they can best be represented by the general formula (R).COOR' in which (R) is a monovalent, aliphatic hydrocarbon radical of 2 to 21 carbon atoms containing one double bond and R' is a monovalent hydrocarbon radical which is free of non-benzenoid unsaturation and which preferably contains 1 to 12 carbon atoms such as an alkyl group or a simple aromatic hydrocarbons group as exemplified by the benzyl group. This preference for esters in which R' contains up to 12 carbon atoms is based on the fact that the esters of high molecular weight have higher melting points and are not as conveniently handled in this particular process as those of lower molecular weight. Neither the particular arrangement of the carbon atoms nor the position of the double bond in the aliphatic chain, represented by (R), is of major significance. Thus, the individual esters of the isomeric acids as well as mixtures of isomeric esters react equally readily. The esters of the following acids are converted into acetals by the process of this invention: acrylic, methacrylic crotonic, vinylacetic, β-ethylacrylic, allylacetic, hydrosorbic, isohydrosorbic decenoic, undecylenic, myristolenic, palmitolenic, oleic, erucic, and brassidic acids. While this invention relates primarily to the preparation of acetals from esters of acids which contain a single double bond, it should be noted that esters of acids, such as linoleic acid, which contain 2 double bonds can likewise be converted into acetals. In such cases, one of the double bonds is for the most part reduced to a single bond and a diacetal is found at the location of the second double bond. Small amounts of the tetra-acetals are formed simultaneously.

The esters of acrylic and α-methylacrylic acids constitute a much preferred class of esters which are readily converted to acetals by this process. Here again, those acrylic and methacrylic esters in which the group corresponding to R' in the general formula is an alkyl group of 1 to 12 carbon atoms are of primary importance and interest.

The group represented by R' is always free of non-benzenoid unsaturation and is typified by the following monovalent groups: methyl, ethyl, isobutyl, tert-amyl, 2-ethylhexyl, diisobutyl, lauryl, benzyl, p-butylbenzyl groups and the like, including their isomeric groups.

It is essential that the reaction be conducted under high pressure. Pressures from 1000 to 4000 lbs. per square inch have proven effective. Actually the maximum pressure which is employed is restricted only by the structural limitations of the available equipment.

Soluble cobalt compounds must be present as catalysts for the reaction. Cobalt carbonyl and soluble cobalt salts of organic carboxylic acids are suitable for this purpose. The chief requirements of the cobalt salt are that it be soluble in the reaction mixture and be free of aliphatic unsaturation. As regards unsaturation, the salts should not contain olefinic or acetylenic bonds, although they may contain aromatic or cyclic groups which are assumed to be unsaturated. Thus, the cobalt salts must be free of non-benzenoid unsaturation. The salts must also be soluble in the reaction mixture at least in an amount necessary to catalyze the reaction. There are a large number of organic cobalt salts which meet these requirements and which are operable in the process of this invention. The invention, therefore, is not dependent on a particular kind of cobalt salt, provided the requirements of solubility and saturation are met. The preferred class, however, of salts which may be employed is made up of the cobalt salts of those acids which have the general formula, RCOOH, in which R represents a hydrocarbon group which is free of non-benzenoid unsaturation and which contains 6 to 22 carbon atoms. Suitable cobalt salts of this kind are typified by those of the following acids: caproic, caprylic, capric, lauric, myristic, palmitic, margaric, stearic, arachidic, behenic, phenylacetic, β-phenylpropionic, biphenylacetic, p-tert-butylphenylacetic, p-ethylphenylpropionic, naphthenic acids and the like. In the case of aliphatic acids, the hydrocarbon portion, which is represented by R in the above general formula, can be a straight- or a branched-chain group, such as in n-octyl, iso-octyl, ditertiary butyl or 2-ethylhexyl group. Thus, the cobalt salts of mixtures of acids, particularly of mixtures of isomeric acids, can be used. The arrangement of the carbon atoms in the acid is not important. Other cobalt salts which can well be used are those of the substituted carboxylic acids shown in U. S. Patents Nos. 1,880,759, 1,939,621, 1,993,520, 1,962,478, 2,063,838, 1,969,709 and 2,044,968 to Bruson and co-workers.

The amount of soluble cobalt compound can be varied widely; although, since the compound is a catalyst, it is most advantageously employed in small, catalytic amounts. As little as 0.001 molar per cent, based on the unsaturated ester is effective and this amount may be raised to 0.05 molar per cent, and in some particular cases to even higher amounts. For example, as much as 0.25 molar per cent of cobalt carbonyl has been used but ordinarily an amount of cobalt carbonyl equal to 0.002–0.02 molar per cent is much preferred. In the case of the soluble cobalt salts of carboxylic acids, the preferred amount is 0.004 to 0.04 molar per cent, although, here too, smaller and larger ratios have been used with good results. The molecular weight of the cobalt salt is a factor because the weight or volume of the salts of the longer fatty acids; e. g., stearic, can interfere with the reaction if large amounts are used. All of the salts, however, as well as the cobalt carbonyl, function well within the limits of 0.001 to 0.05 molar per cent based on the weight of the unsaturated ester.

Inert solvents, such as benzene, toluene and the like, can be employed, if desired, to facilitate the reaction and can be separated from the products by distillation.

This invention is directed primarily to the production of ester-acetals; and by this process, the acetals are prepared very efficiently. The invention has the further advantage of providing a good method for making aldehydo-esters which cannot be otherwise prepared satisfactorily due to their tendency to form polymers and by-products. Now, such aldehydo-esters can be made by splitting, under acidic conditions, the stable acetals which are made by the instant process.

The following examples serve to illustrate how the process of this invention is carried out. While the examples are limited to the reaction of carbon monoxide, hydrogen, methanol or ethanol, and only a fraction of the unsaturated esters which can be converted to ester-acetals, it is to be understood that the other unsaturated esters, especially those set forth above, are converted in a similar manner.

*Example 1*

Into a high-pressure tubular autoclave of 500 c. c. capacity was charged 173 c. c. (1.6 moles) of ethyl acrylate, 144 c. c. (3.6 moles) of methanol, 50 c. c. of benzene and 15 c. c. of a 30% solution of cobalt di-2-ethyl hexoate in benzene. The autoclave was closed and heating was begun. An equimolecular mixture of hydrogen and carbon monoxide was introduced until the pressure in the autoclave was 3000 lbs. per square inch at a temperature of 100° C. The mixture was held at 100° C. for one hour. A constant pressure of 3000 lbs. per square inch was maintained although the reactor was slightly vented so that the reaction mixture was agitated by the gas bubbling through it. The mixture was cooled and removed from the autoclave. The crude ethyl gamma,gamma-dimethoxybutyrate was distilled at a reduced pressure of 27 mm. There was obtained a 70% yield of water-white ethyl gamma-gamma-dimethoxybutyrate, B. P. 100–105° C./27 mm., $$N_{20}^d 1.4175$$

Analysis showed this product to be 92–93% pure, with ethyl gamma-oxobutyrate as the impurity.

*Example 2*

Methyl methacrylate was converted in an identical manner to methyl-α-methyl-gamma,-gamma-di-methoxybutyrate. A yield of 60–65% was readily obtained.

Example 3

Into the same high pressure tubular autoclave was charged 264 grams of methyl oleate (0.9 mole), 64 grams (2.0 moles) of methanol and 20 c. c. of a 12% solution of cobalt carbonyl in benzene. The autoclave was closed and heating was started. An equimolecular mixture of hydrogen and carbon monoxide was introduced until the pressure in the autoclave was 3000 lbs. per square inch at a temperature of 150° C. The mixture was held at 150° C. for one hour, after which it was cooled and removed from the autoclave. During the heating period a pressure of 3000 lbs. per square inch was maintained, although the reactor was vented slightly in order to allow a passage of gas therethrough which served to agitate the mixture. A 40% yield was obtained of a mixture of methyl 9-dimethoxymethylstearate and methyl 10-dimethoxymethylstearate having respectively the formulas:

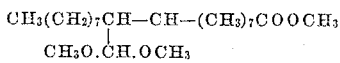

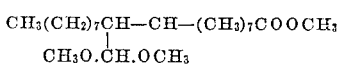

Similar results to those of the above examples were obtained by substituting an equivalent amount of ethanol for the methanol.

We claim:

1. A process for the preparation of ester-acetals which comprises reacting, at a pressure of 1000 to 4000 lbs. per square inch and at a temperature of 80° C. to 200° C., a mixture of carbon monoxide, hydrogen, an alcohol from the class consisting of methanol and ethanol, and an ester having the general structural formula (R)COOR' in which (R) represents a monovalent, aliphatic, hydrocarbon radical of 2 to 21 carbon atoms containing one double bond and R' is a monovalent, hydrocarbon radical which is free of non-benzenoid unsaturation and which contains 1 to 12 carbon atoms, in the presence of 0.001 to 0.05 mole per cent, based on said ester, of a dissolved cobalt catalyst from the class consisting of cobalt carbonyl and organic acid salts of cobalt which are free of non-benzenoid unsaturation and which are soluble in said mixture, and separating the resultant acetal from the reaction mixture.

2. A process for the preparation of ethyl gamma,gamma-dimethoxybutyrate which comprises reacting at a pressure of 1000 to 4000 lbs. per square inch and at a temperature of 80° C. to 200° C., a mixture of carbon monoxide, hydrogen, methanol and ethyl acrylate in the presence of from 0.001 to 0.05 mole per cent, based on said ethyl acrylate, of a dissolved cobalt salt of an organic acid which is free of non-benzenoid unsaturation, and isolating the resultant ethyl gamma,gamma-dimethoxybutyrate.

3. The process of preparing methyl α-methyl-gamma,gamma-dimethoxybutyrate which comprises reacting at a pressure of 1000 to 4000 lbs. per square inch and at a temperature of 80° C. to 200° C., a mixture of carbon monoxide, hydrogen, methanol and methyl methacrylate in the presence of from 0.001 to 0.05 mole per cent, based on said methyl methacrylate, of a dissolved cobalt salt of an organic acid which is free of non-benzenoid unsaturation, and isolating the resultant methyl α-methyl-gamma,gamma-dimethoxybutyrate.

4. The process of preparing a mixture of methyl 9-dimethoxymethylstearate and methyl 10-dimethoxymethylstearate which comprises reacting, at a pressure of 1000 to 4000 lbs. per square inch and at a temperature of 80° C. to 200° C., a mixture of carbon monoxide, hydrogen, methanol and methyl oleate in the presence of from 0.001 to 0.05 mole per cent, based on said methyl oleate, of cobalt carbonyl, and isolating the resultant mixture of methyl dimethoxymethylstearates.

CHARLES H. McKEEVER.
GEORGE H. AGNEW.

No references cited.